United States Patent [19]

Sakai et al.

[11] 3,943,799
[45] Mar. 16, 1976

[54] CONTROLS FOR FOUR-FORWARD-SPEED AUTOMATIC TRANSMISSIONS

[75] Inventors: Toshimitsu Sakai; Tadashi Saito, both of Toyota, Japan

[73] Assignee: Toyota Jidosha Kogyo Kabushiki Kaisha, Japan

[22] Filed: Feb. 19, 1975

[21] Appl. No.: 551,148

Related U.S. Application Data

[63] Continuation of Ser. No. 440,003, Feb. 6, 1974, abandoned.

[30] Foreign Application Priority Data

Apr. 24, 1973 Japan.................................. 48-45736

[52] U.S. Cl..................................... 74/866; 74/869
[51] Int. Cl.²......................................... B60K 41/18
[58] Field of Search .............. 74/866, 867, 868, 869

[56] References Cited
UNITED STATES PATENTS

| | | | |
|---|---|---|---|
| 3,726,157 | 4/1973 | Marumo ........................... | 74/866 X |
| 3,752,011 | 8/1973 | Casey et al. ...................... | 74/866 X |
| 3,776,048 | 12/1973 | Enomoto et al. ..................... | 74/866 |
| 3,813,964 | 6/1974 | Ichimura et al...................... | 74/866 |

*Primary Examiner*—Samuel Scott
*Assistant Examiner*—Lance W. Chandler
*Attorney, Agent, or Firm*—Toren, McGeady and Stanger

[57] ABSTRACT

Controls for automatic transmissions of the four-forward-speed type having two shift valves equipped with solenoid valves in a hydraulic system, and a manual valve for changing over the fluid passages or lines in the reverse and forward speed regions. The automatically controlled shift positions in the first to fourth speed ranges in the forward speed region and the shift positions to be assumed by restricting the shift range by manual operation are attained by means of the two solenoid valves in response to signals from an electric control system.

2 Claims, 5 Drawing Figures

CONTROLS FOR FOUR-FORWARD-SPEED AUTOMATIC TRANSMISSIONS

This is a continuation of application Ser. No. 440,003 filed Feb. 6, 1974.

BACKGROUND OF THE INVENTION

This invention relates to controls using an electronic control system for automatic transmissions of the four-forwardspeed type equipped with a hydraulic torque converter.

All conventional controls for automatic transmissions have depended upon hydraulic control systems for their shift control. On the other hand, controls employing electronic control systems have already been proposed which positively determine the shifting points by electrically determining the vehicle speed and throttle opening and setting the shift pattern which permit the power train design to meet sports-car-like specifications. Controls of the electronically controlled type, when incorporating an electric control system, tend to be expensive. When the number of shift positions is limited, e.g., to three speed positions, the number of parts required for such controls is correspondingly small and it poses no practical problem. However, with a greater number of shift positions, e.g., four or five speed positions, a larger number of parts will be needed, thereby giving rise to an economic disadvantage. In addition, the increased number of shift positions will complicate the shift pattern and call for greater precision in the sensing of the vehicle speed and throttle-opening and of the shift pattern setting. In this connection, the provision of an electric control system is highly advantageous.

The present invention therefore has for its object to simplify the construction of controls of the electronically controlled type for four-forward-speed automatic transmissions.

SUMMARY OF THE INVENTION

To this end, the controls provided in accordance with this invention comprise a manual valve for the fluid control circuit which shifts and controls the fluid pressure in only the forward and reverse passages or lines, and two shift valves for shifting the pressure in the forward lines in response to shifting signals from an electric control circuit, so that automatic shifting to any of the four forward speeds is made possible with the fluid pressure in the reverse lines and one of the two shift valves providing a reverse speed.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
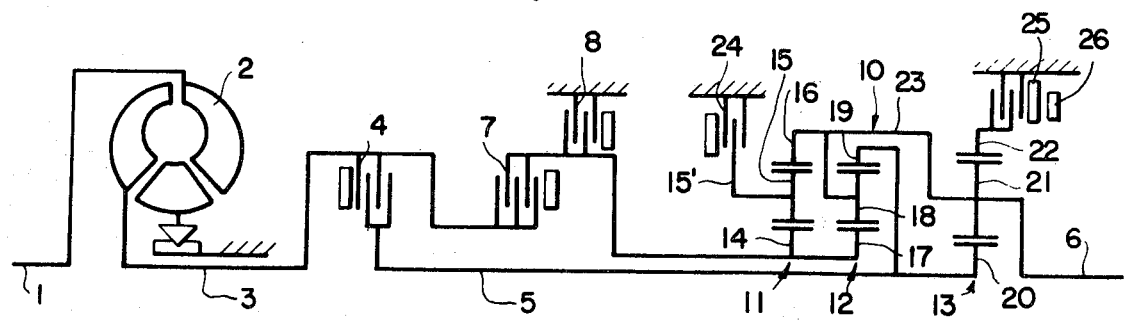
FIG. 1 is a schematic illustration of a four-forward-speed automatic transmission incorporating the present invention, so arranged that engine braking is always applicable.
Figure 2:
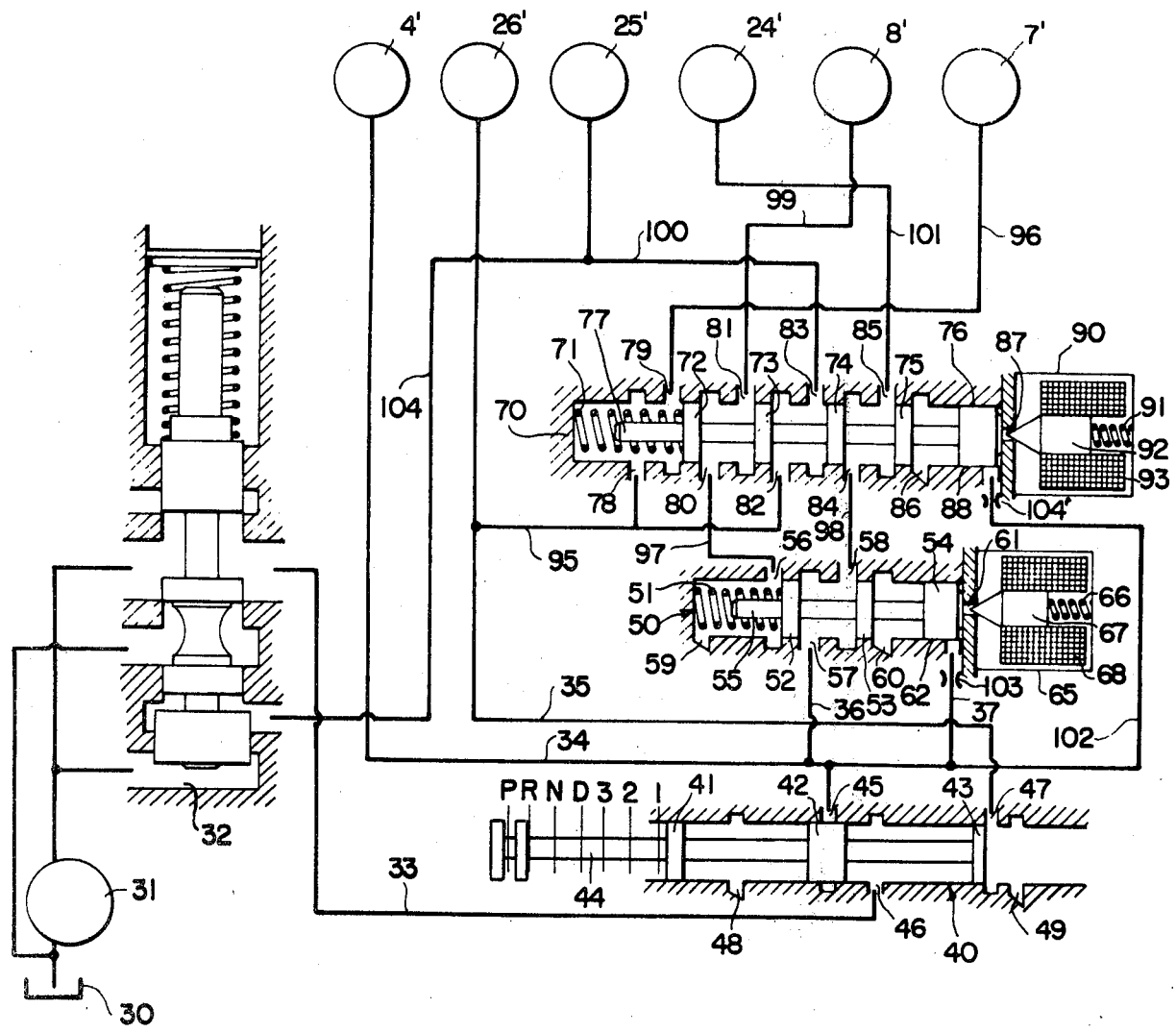
FIG. 2 is a schematic circuit diagram of a hydraulic control circuit for the above arrangement.
Figure 3:
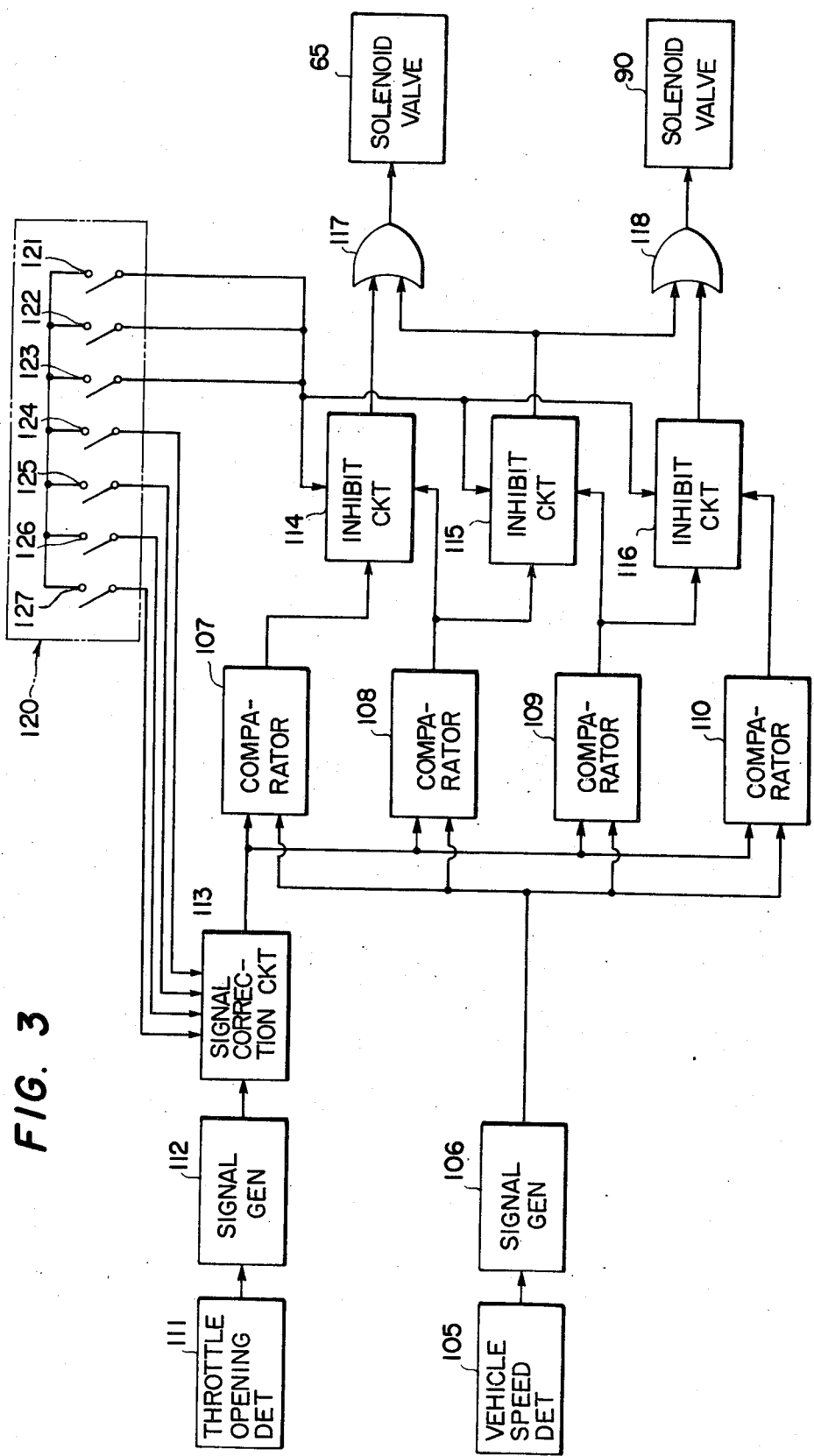
FIG. 3 is a diagram of electric control circuitry for the same arrangement.

Referring to FIGS. 1 to 3, there is shown an embodiment of the present invention as incorporated in a four-forwardspeed-and-one-reverse automatic transmission so constructed as to be capable of engine braking at all times. In FIG. 1, an engine crankshaft 1 is shown as connected to an output shaft 6 through a torque converter 2, an input shaft 3, a front clutch 4, an intermediate shaft 5, and a gear unit 10. The drum side of the front clutch 4 is connected to the hub side of a rear clutch 7, the drum side of which is provided with a third brake 8. The gear unit 10 has three sets of single planetary gears 11, 12, 13. A ring gear 19 and a sun gear 20 for the planetary gears 12, 13 are in mesh with the intermediate gear 5. The sun gears 14, 17 for the planetary gears 11, 12 are associated with the rear clutch 7. A ring gear 16 for the planetary gear 11 is connected to a planet-pinion carrier 23. Pinions 18, 21 of the planetary gears 12, 13 are held on pinion shafts in a planet-pinion carrier 23, which in turn is connected to the output shaft 6. Another carrier 15' holding the pinion 15 of the planetary gear 11 is provided with a second brake 24. The ring gear 22 of the planetary gear 13 is associated with a first brake 25 and a reverse brake 26, which have a common brake plate but use different brake pistons.

With the construction described above, the power delivered from the crankshaft 1 through the torque converter 2 to the input shaft 3 is thence transmitted to the intermediate shaft through the agency of the front clutch 4, thus establishing forward drive. At this point, the first brake 25 is actuated to restrain the rotation of the ring gear 22, the second brake 24 to restrain the rotation of the carrier 15', and the third brake 8 to restrain the rotation of the sun gears 14, 17, and the rear clutch 7 is engaged to provide power input to those sun gears, so that the output shaft 6 attains the first, second, third, and fourth speeds in succession to permit engine braking at any desired moment. Power for reverse operation may be directed to the output shaft by the engagement of the rear clutch 7 instead of the front one and by the actuation of the reverse brake 26 along with the first brake 25 thereby to restrain the rotation of the ring gear 22.

The shifting functions of the components are tabulated in Table 1, in which the reference numerals denote the clutches and brakes, which are represented by circles in the cases where they are operable.

Table 1

|  | 4 | 7 | 25 | 24 | 8 | 26 |
|---|---|---|---|---|---|---|
| 1st speed, w/engine brake | O |   | O |   |   |   |
| 2nd speed | O |   |   | O |   |   |
| 3rd speed | O |   |   |   | O |   |
| 4th speed | O | O |   |   |   |   |
| Reverse |   | O | O |   |   | O |

FIG. 2 illustrates an exemplary hydraulic control circuit for selectively actuating the clutches 4, 7 and brakes 8, 24, 26 of an automatic transmission. Pressure fluid pumped up from an oil reservoir 30 by an oil pump 31 is set to a predetermined pressure level by a regulator valve 32, and is delivered through a line 33 to a manual valve 40. From the manual valve the fluid flows through a first-to-second shift valve 50 equipped with a solenoid valve 65 and through a second-to-third shift valve 70 equipped with a solenoid valve 90, and then is supplied or drained in hydraulic servo mechanisms 4', 7', 8', 24', 25', 26' which in turn operate the clutches 4, 7 and brakes 8, 24, 25, and 26. The manual valve 40 is adapted to move to any of its seven positions or ranges, i.e., Park, Reverse, Neutral, Drive, Drive-3, Drive-2, and Drive-1. This valve comprises a spool 44 which is formed with lands 41 to 43, and has ports 45, 46, 47 and drain ports 48, 49. The port 46 communicates with the line 33, and the ports 45, 47 communicate with hydraulic servo mechanisms 4', 26' via lines 34, 35, respectively.

The first-to-second shift valve 50 consists of a spool 55 which is loaded with a spring 51 at one end and has lands 52, 53, 54, and a hydraulic fluid chamber 62 formed with ports 56 to 58, drain ports 59, 60, and an exhaust orifice 61. The port 57 and chamber 62 are communicated through passages 36, 37 branched from the line 34. The solenoid valve 65 includes a plunger 67 adapted to open and close the exhaust orifice 61 under the urging of a spring 66, and a coil 68. When the solenoid valve 65 is de-energized, the plunger 67 closes the exhaust orifice 61 and a fluid pressure produced in the chamber 62 forces the spool 55 to move to the left, establishing communications between the ports 56 and 57 and between the port 58 and drain port 60. When the chamber 62 is not supplied with fluid or when the solenoid valve 65 is energized with the coil 68 excited so that the plunger 67 recedes to open the exhaust orifice 61, the spool 55 is moved backward to the right and communications are established between the port 56 and drain port 59 and between the ports 57 and 58.

The second-to-third shift valve 70 consists of a spool 77 loaded with a spring 71 at one end and having lands 72 to 76, and a hydraulic fluid chamber 88 having ports 78 to 85, drain port 86 and orifice 87. The ports 78, 82 are communicated with the oil line 35 via a line 95; the port 79 with the hydraulic servo 7' via a line 96; the ports 80, 84 with the ports 56, 58 of the first-to-second shift valve 50 via lines 97, 98; the port 81 with the hydraulic servo 8' via a line 99; the port 83 with the hydraulic servo 25' via a line 100; the port 85 with the hydraulic servo 24' via a line 101; and the fluid chamber 88 with the line 37 via a line 102. The solenoid valve 90 consists of a plunger 92 which is urged by a spring 91 at one end and by a coil 93 to open and close an exhaust orifice 87. When a fluid pressure has been produced in the chamber 88 upon de-energizing of the solenoid valve 90, in the same manner as above described, the spool 77 is moved to the left and communications are maintained between the ports 79 and 80, 81 and 82, 83 and 84, and between the port 85 and drain port 86. When the fluid chamber 88 has been exhausted or the solenoid valve is energized, the spool 77 is moved back to the right, providing communications between the ports 78 and 79, 80 and 81, 82 and 83, 84 and 85. The lines 37, 102 are provided with orifices 103, 104'. Between a line 100 and the pressure-applying side of the regulator valve 32, there is connected a line 104 for increasing the fluid pressure during the first speed and reverse operations.

Thus, when the manual valve 40 is in the Park range position, its ports 45, 47 are closed by the lands 42, 43, and in the Neutral range position, the port 46 is closed by the land 42 and all the hydraulic servos 4', 7', 8', 24' to 26' are exhausted regardless of any electric signals from the solenoid valves 65, 90. In the reverse position, the manual valve 40 has its ports 46, 47 communicated so that the fluid pressure from the line 33 is supplied to the hydraulic servo 26' via the line 35. At this point, the fluid chamber 88 of the second-to-third shift valve 70 is exhausted and the spool 77 is moved to the right. As a result, the pressure from the line 35 is delivered to the servo 7' by way of the lines 95, 96 and also the servo 25' via the line 100, so as to actuate the clutch 7 and brakes 25, 26 for reverse operation.

With the manual valve 40 in the Drive position, communication is established between its ports 45 and 46 to permit the pressure from the line 33 to be supplied to the servo 4' through the line 34 and cause the clutch 4 to be engaged for forward operation. In this stage, the solenoid valve 65 is energized and the spool 55 of the first-to-second shift valve 50 is moved to the right, whereas the solenoid valve 90 is de-energized and the pressure from the chamber 88 forces the sppool 77 of the second-to-third shift valve 70 to the left. Accordingly, the pressure from the line 34 is supplied to the servo 25' via the lines 36, 98, 100, and the first brake 25 is thereby activated to provide the first speed. If, at this time, the solenoid valve 90 is energized, too, and the spool 77 of the second-to-third shift valve 70 is moved back to the right, then the pressure from the line 98 is directed to the servo 24' through the line 101, and the second brake 24 is activated to provide the second speed. If the solenoid valve 65 is de-energized while the solenoid valve 90 is energized, the pressure from the chamber 62 causes the spool 55 of the first-to-second shift valve 50 to move back to the left. Consequently, the pressure from the line 30 is supplied to the servo 8' through the lines 97, 99 and the third brake 8 is activated to provide the third speed. If, in this stage, the solenoid valve 90 is de-energized, too, the pressure from the line 97 is supplied to the servo 7' through the line 96 and the rear clutch 7 is actuated to provide the fourth speed. When the manual valve 40 is shifted to the Drive-3, -2, and -1 range positions, its spool 44 is moved to the right in the order mentioned. In each position the lands 41, 42 maintain the communication between the ports 45 and 46 and have the servo 4' supplied with the fluid. Also, in the same manner as in the Drive position, the solenoid valves 65, 90 are energized or deenergized. However, because the shift points in the respective ranges are changed by the electric control circuitry to be described later, the manual valve 40 provides, in the Drive-3 range position, the first to third gear ratios or speeds; in the Drive-2 position, the first and second speeds; and, in the Drive-1 range, the first speed only.

The above-described relations between the shift ranges and the functioning of the solenoid valves 65, 90, i.e., which is energized and which is not, are tabulated in Table 2. The numerals indicate the valves which are energized when represented by "0" and these de-energized when represented by "X".

Table 2

|  | 65 | 90 |
| --- | --- | --- |
| Park range | X | X |
| Reverse " | X | X |
| Neutral " | X | X |
| 1st speed range | O | X |
| 2nd      " | O | O |
| 3rd      " | X | O |
| 4th      " | X | X |

FIG. 3 illustrates an example of the electric control circuitry for energizing or de-energizing the solenoid valves 65, 90. A vehicle-speed detector 105 of a known type is connected to four comparators 107 to 110 through a signal generator 106 which converts a given number of pulses into an analog value. A throttle opening detector 111 of a known type which detects the throttle opening corresponding to the engine load is likewise connected to the comparators 107 to 110 via a signal generator 112 which generates signals as converted to voltages and a signal correction circuit 113. In response to the input of a signal from the shift range setter 120, the signal correction circuit 113 determines the response characteristics of the system to the throttle opening signal and changes the reference level to the comparators 107 to 110 so that the shift pattern for the Drive range is made dissimilar to that for the Drive-3, -2, or -1 range. The comparators 107 to 110 compare the vehicle speed signal and throttle opening signal and, depending on the relationship between the two, they function in the following way. When the transmission arrangement is in the first speed range, only the comparator 107 emits a signal 1; in the second speed range, the two comparators 106, 108 emit a signal 1; in the third speed range, the three comparators 107 to 109 emit a signal 1; and in the fourth speed range, all the comparators 107 to 110 emit a signal 1. Of these comparators, 107 to 109 are connected to the solenoid valves 65, 90, respectively, through inhibit circuits 114, 116, and OR circuits 117, 118; the comparator 108 is connected to both OR circuits 117, 118 via an inhibit circuit 115; and the comparators 108 to 110 are connected to the inhibit sides of the inhibit circuits 114 to 116. The shift range setter 120 has seven switches 121 to 127 which are adapted to be turned ON or OFF in a manner corresponding to the Park, Reverse, Neutral, Drive, Drive-3, Drive-2, and Drive-1 ranges. Of these switches, 121 to 123 are connected together to the inhibit sides of the inhibit circuits 114 to 116, and the remaining switches 124 to 127 are connected to the signal correction circuit 113.

Thus, in the case of Park, Reverse, or Neutral range, the inhibit circuits 114 to 116 act to make the input signals to the OR circuits 117, 118 zero, with the result that the solenoid valves 65, 90 are de-energized. In the case of the Drive range, the switch 124 turns ON and the signal correction circuit 113 determines the shift pattern. In the first speed range, the OR circuit 117 emits a signal, upon the receipt of a signal from the comparator 107, to energize the solenoid valve 65 alone. In the second speed range, a signal from the comparator 108 causes the inhibit circuit 114 to function, but, because the signal is applied as an input to both OR circuits 117, 118 to produce output signals, the solenoid valves 65, 90 are energized. In the third speed range, a signal from the comparator 109 activates the inhibit circuit 115 and therefore the solenoid valve 65 is de-energized. In the fourth speed range, a signal from the comparator 110 causes the inhibit circuit 116 to act so that the solenoid valve 90 is de-energized, too.

Next, in the case of the Drive-3 range, the switch 125 is turned ON and the signal correction circuit 113 changes the shift points for the third and fourth speed ranges, and, in the first, second, and third speed ranges, the solenoid valves 65, 90 are energized and de-energized in the same manner as above described. In the case of the Drive-2 range, the switch 126 is turned ON and the shift points for the second and third speed ranges are changed and the valves are energized and de-energized in the same way as for the first and second speed ranges. Further, in the case of the Drive-1 range, the switch 127 is turned ON and the shift points for the first and second speed ranges are changed and the valves are energized and de-energized in the same manner as for the first speed range alone.

In the manner described, the solenoid valves 65, 90 are energized and de-energized in accordance with the applicable ranges and shift stages as given in Table 2. In such an event the signal correction circuit 113 may correct not merely the throttle opening signal but the vehicle speed signal instead, or both, so as to change the shift pattern for each of the forward speed ranges.

Figure 4:
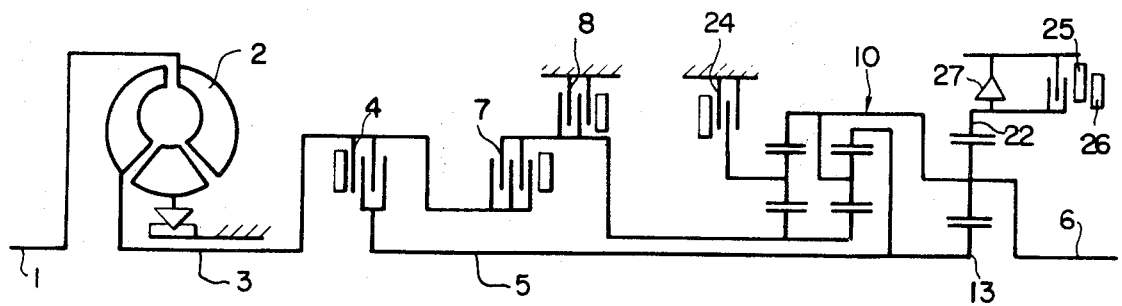
FIG. 4 is a schematic illustration of a four-forward-speed automatic transmission incorporating the present invention, so arranged that engine braking is selectively applicable.
Figure 5:
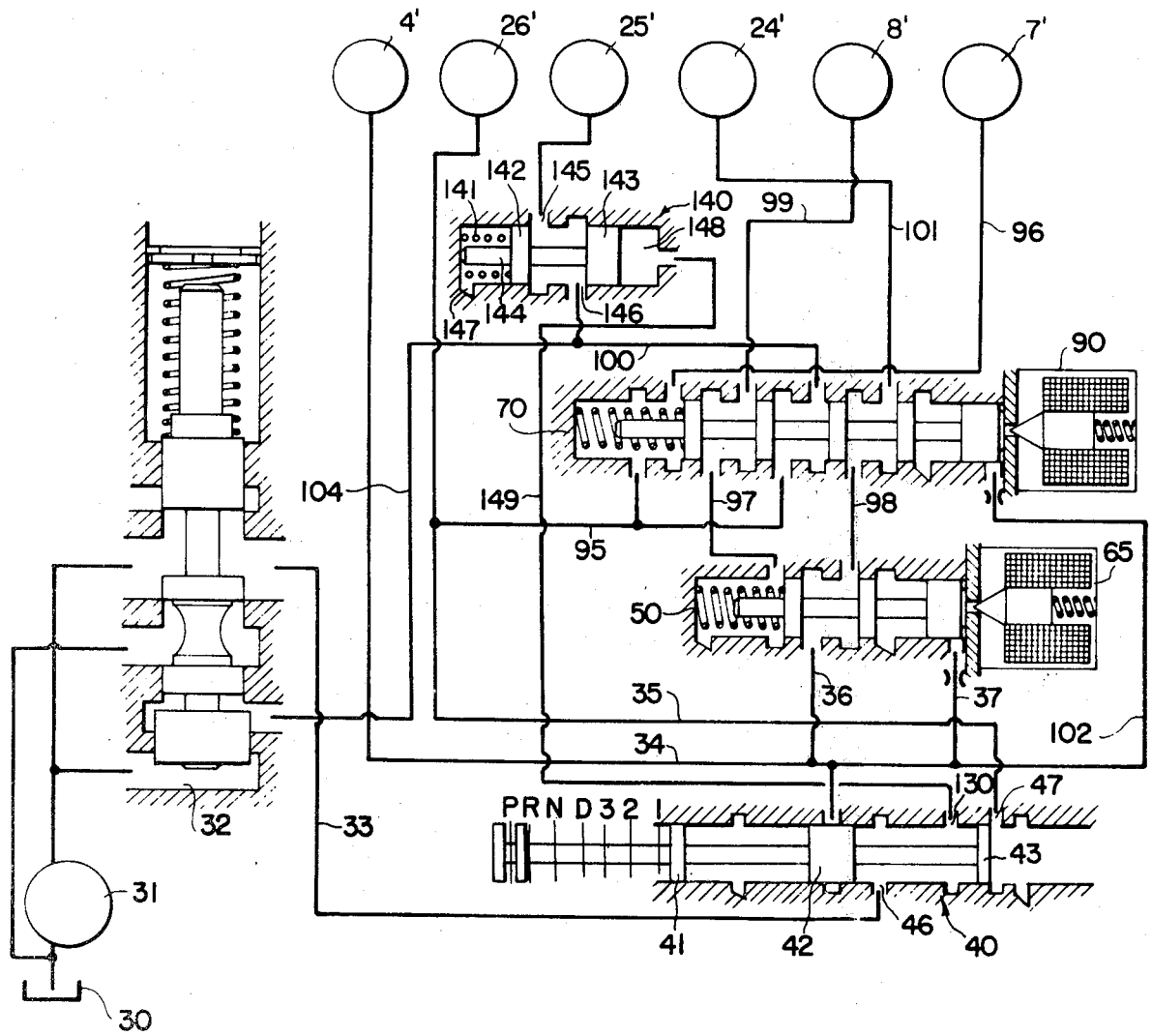
FIG. 5 is a schematic circuit diagram of a hydraulic control circuit for the above arrangement.

FIGS. 4 and 5 illustrate an automatic transmission of the four-forward-speed-and-one-reverse type embodying the present invention which is free from engine braking during normal forward operation in the first speed range. Referring specifically to FIG. 4, the construction is practically the same as that shown in FIG. 1, except that a one-way clutch 27 is added between the ring gear 22 of the planetary gear 13 and the case. As the front clutch 4 is engaged to transmit the engine power thereby to rotate the ring gear 22, the one-way clutch 27 is engaged, too, so as to restrain the rotation of the ring gear 22 in the same way as when the first brake 25 is actuated. When driven to the reverse by the power from the output shaft 6, the one-way clutch 27 remains inactive to set the ring gear 22 free and provide the first speed without the capability of engine braking. The first speed without engine braking is provided where it is shifted to the second and further speeds, such as the Drive, Drive-3, and Drive-2 ranges in the forward shift region, in order to reduce the shock of shifting from the first to second and further speed positions. The Drive-1 range along attains the first speed with the capability of engine braking through the agency of the first brake 25.

In the same manner as in Table 1, the shift patterns described above may be tabulated in Table 3.

Table 3

|  | 4 | 7 | 25 | 24 | 8 | 26 | 27 |
| --- | --- | --- | --- | --- | --- | --- | --- |
| 1st speed (D, 3, 2 ranges) | O |  |  |  |  |  | O |
| 2nd speed (D, 3, 2 ranges) | O |  |  | O |  |  |  |
| 3rd speed (D, 3 ranges) | O |  |  |  | O |  |  |
| 4th speed (D range) | O | O |  |  |  |  |  |
| 1 range | O |  | O |  |  |  |  |
| R range |  |  | O | O |  | O |  |

FIG. 5 shows an exemplary hydraulic control circuitry for selectively activating the clutch 7 and brakes 8, 24 to 26 of the automatic transmission, by energizing and de-energizing the solenoid valves 65, 90 in the same way as tabulated in Table 2, through the same electrical control circuitry as given in FIG. 3. Like the one shown in FIG. 2, this arrangement includes the manual valve 40, first-to-second-shift valve 50 equipped with the solenoid valve 65, second-to-third shift valve 70 equipped with the solenoid valve 90, and hydraulic servo mechanisms 4', 7', 8', 24' to 26'. The manual valve 40 has an additional port 130, and the fluid line 100 leading to the servo 25' is provided with a valve 140 for actuating the first brake. The port 130 of the manual valve 40 is formed between the ports 46 and 47, in such a manner as to be communicated with the port 46 by the lands 42, 43 when the valve is in either the Park or Reverse range. In the Drive-1 range, too, it is communicated with the port 46 by means of the lands 41, 42. The valve 140 consists of a spool 144 which is loaded with a spring 141 at one end and has lands 142, 143, and the surrounding wall formed with ports 145, 146, a drain port 147, and a fluid chamber 148. Both ports 145, 146 are communicated with the line 100, and the fluid chamber 148 communicates with the port 130 of the manual valve 40 through a line 149.

In the Park range position, the manual valve 40 supplies fluid pressure from its port 130 to the line 149, and the pressure produced in the chamber 148 of the valve 140 moves the spool 144 to the left and establishes communication between the ports 145 and 146, but, in the absence of pressure in the line 100, the hydraulic servo 25' is exhausted. In the case of the Reverse range, the ports 145 and 146 of the valve 140 are communicated just as in the Park range, and the fluid pressure fed to the line 100 by the second-to-third shift valve 70 is supplied to the servo 25'. In the Drive, Drive-3, and Drive-2 ranges, the port 130 of the manual valve 40 is not supplied with fluid pressure, and therefore the spool 144 in the valve 140 is moved to the right, so that the communication between the ports 145 and 146 is interrupted by the land 142. Thus, during the first speed, the hydraulic servo 25' is exhausted even though the line 100 is supplied with the fluid pressure as the solenoid valves 65, 90 are energized and de-energized. This causes shifting to the Drive-1 range and supply of the pressure to the port 130, with the result that the valve 140 is actuated and the pressure from the line 100 is supplied to the hydraulic servo. From then on, shifting is accomplished entirely in the same manner as with the arrangement of FIG. 2. Using the electric control circuitry of FIG. 3, the first speed status with or without engine braking is selectively attained.

As has been described above, the present invention permits controls for automatic transmission of the four-forward-speed type to have only two solenoid valves 65, 90 regardless of the design whereby engine braking is either attained at any desired point or is selectively applicable. This simplifies the structure of the electrical and hydraulic control circuitry and accordingly offers a saving in the manufacturing cost. Among other advantages, as in the case of the first embodiment, the hydraulic circuit from the manual valve 40 is common with the Drive, Drive-3, -2, and -1 ranges and the shift control is accomplished by signals from the electrical control circuit, and therefore the construction of the fluid passages and lines is simplified and the designing of the valve body may be accomplished easily.

While specific embodiments of the invention have been shown and described in detail to illustrate the application of the inventive principles, it will be understood that the invention may be embodied otherwise without departing from such principles.

What is claimed is:

1. In an automatic transmission for an automotive vehicle of the four-forward-speed type having shiftable gear means for changing the power transmission ratio of said transmission, said gear means being structured to provide a plurality of shift ranges including four forward speed ranges and a reverse range, gear shift means including means for setting a plurality of gear shift ranges and hydraulic servo means for controlling transmission clutch and brake means to effect shifting of said gear means in response to pressure fluid supplied to or drained from said hydraulic servo means, said hydraulic servo means including four hydraulic servo mechanisms for controlling shifting in said forward speed ranges and one hydraulic servo mechanism for providing reverse speed operation, a hydraulic fluid source, and a hydraulic control circuit for controlling flow of pressure fluid to and from said hydraulic servo mechanisms, a control system comprising:

signal generating means for generating electrical signals representative of the operating condition of said vehicle;

logic circuit means responsive to said gear shift means for emitting electrical signals in accordance with the signals received from said signal generating means, said emitted signals being representative of the shift range setting of said gear shift means and of the operating condition of said vehicle;

a manual valve included in said hydraulic control circuit connected for flow communication with said hydraulic fluid source and including first and second port means, and means for selectively communicating said first and second port means with said fluid source;

a first shift valve having said first port means of said manual valve connected thereto, and including a pair of output ports and means for selectively communicating said manual valve first port means with said pair of output ports;

a second shift valve connected to said pair of output ports of said first shift valve, and including a first pair and a second pair of output ports and means for selectively individually communicating said pair of output ports of said first shift valve with said first and said second pair of output ports of said second shift valve;

means individually connecting each of the ports of said first and second pair of output ports of said second shift valve with one each of said forward speed hydraulic servo mechanisms;

said first and second shift valves operating to selectively supply pressure fluid from said first port of said manual valve to said four foward speed servo mechanisms to perform shifting within said four foward speed ranges in accordance with the shift range setting of said transmission;

shift valve actuating means responsive to said logic circuit means to control operation of said first and second shift valves in accordance with signals emitted from said logic circuit means; and means for communicating said second port of said manual valve with said one reverse speed hydraulic servo mechanism by way of one of said first and second shift valves so that there may be obtained four forward speeds including a first forward speed capable of providing engine braking at all times and one reverse range.

2. A control system according to claim 1 wherein one of said four hydraulic servo mechanisms is arranged to attain a first forward speed and wherein said manual valve includes a third port, each of said three ports of said manual valve being capable of being communicated with said hydraulic pressure source, respectively, during forward drive, reverse drive, and first speed with engine braking, said system including valve means provided in said hydraulic control circuit for supplying hydraulic pressure in said one of said four hydraulic servo mechanisms arranged to attain a first forward speed to be communicated by the fluid pressure from said third port of said manual valve to attain four forward speeds including a first speed that is selectively capable either of providing or not providing engine braking and one reverse range.

* * * * *